Figure 1:
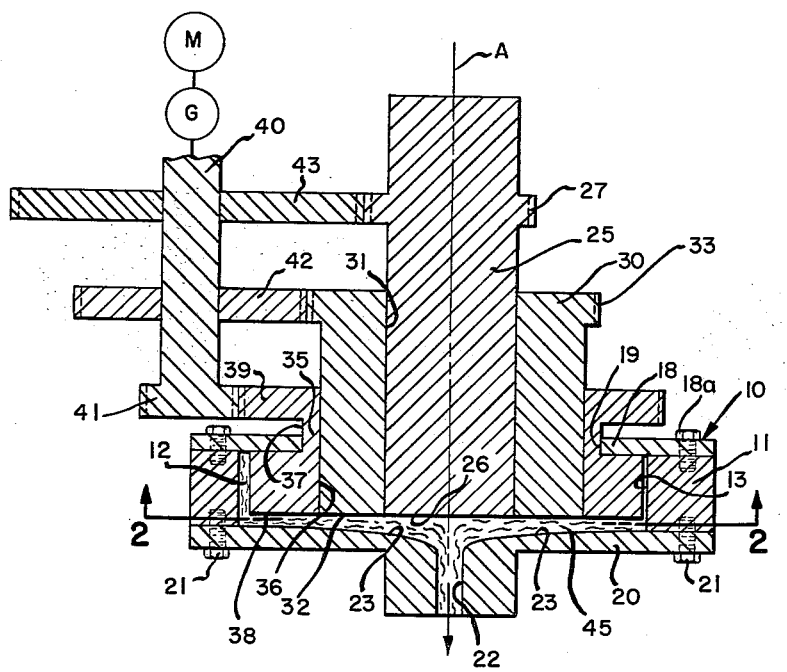

March 5, 1963 E. L. ADAMS 3,079,635
SCREWLESS EXTRUDER WITH MULTIPLE SPEED ROTATING DISC
Filed Dec. 5, 1960

*INVENTOR.*
ELMER L. ADAMS
BY W.A. Schoich and
Charles S. Lynch
ATTORNEYS

United States Patent Office 3,079,635
Patented Mar. 5, 1963

3,079,635
SCREWLESS EXTRUDER WITH MULTIPLE SPEED ROTATING DISC
Elmer L. Adams, Toledo, Ohio, assignor to Owens-Illinois Glass Company, a corporation of Ohio
Filed Dec. 5, 1960, Ser. No. 73,784
12 Claims. (Cl. 18—12)

The present invention relates to an improved elastic melt extruder and more particularly to an elastic melt extruder capable of increased output and utilizing a plurality of co-rotatable plasticizing discs.

There has been recently developed a new type of plasticizer-extruder commonly known as an "elastic melt extruder" utilizing "the normal force effect," i.e., the normal force developed when a visco-elastic material is sheared between a rotating plate and a stationary plate, to perform the functions of a conventional plasticizer-extruder. Such an elastic melt extruder is described in "Modern Plastics Magazine" of October 1959, at page 107, in an article by Bryce Maxwell and Anthony J. Scalora.

An elastic melt extruder utilizes a power-driven, rotatable disc operable within a convolute chamber to which solid plastic material is furnished from a supply hopper or the like. A radial face of the disc is spaced through a narrow gap from the corresponding face of an orifice plate having an exit orifice axially aligned with the disc. As the disc is rotated, the thermoplastic material introduced peripherally of the disc and confined between the radial faces of the disc and the orifice plate is subjected to shearing forces. The thermoplastic material is essentially elastic and the tendency of the sheared material for elastic recovery after arcuate shearing and stretching between the radial faces effects centripetal flow of material between the disc and the orifice plate toward the central orifice, the material issuing from the orifice in plasticized condition at a predetermined pressure.

The output rate of an elastic melt extruder depends upon the rate at which shearing is accomplished in the gap of the shearing zone, i.e. in the axial gap between the radial faces of the disc and of the orifice plate. This shear rate is directly proportional to the surface speed of the disc and is inversely proportional to the width of the gap.

Thus, superficially, the output rate should be susceptible to increase by merely increasing the speed of rotation of the disc. However, such an increase in speed will, above certain limits, result in thermal degradation of the thermoplastic material because of the much greater surface speed of the disc at its outer periphery. The consequent increase in the shearing force exerted upon the material and the greater heat developed therein places a definite limitation on the possibility of increasing the output rate by speeding up the disc rotation.

Decreasing the gap between the disc and the plate increases the shear rate, but decreases the path of flow of plasticized material to the orifice, and thus reduces the output. If the gap were of constant width throughout, the shear rate would be at a maximum at the outer periphery of the disc and at a minimum at the center of the disc, due to lower speed of the shearing disc at the center. Increasing the gap width adjacent the extrusion orifice reduces the shear rate, but opens up the flow path to actually increase the output of the extruder under proper conditions.

The present invention increases the output rate by increasing the effective disc speed and by increasing the gap. Such results are obtained by utilizing a multi-piece disc consisting of concentric independently driven annular disc sections concentric around a central disc section aligned with the extrusion orifice. Since the disc sections are of varying diameter, the surface speeds of the discs can be readily correlated by driving the discs through separate drive mechanisms, such as individual sets of gears so that the surface speed of the disc adjacent the extrusion orifice is much higher than if a single disc only were utilized. Thus, a greater surface speed at the point where the material leaves the chamber is obtained without thermal degradation at the disc periphery. Further, by maintaining such high surface speeds in the vicinity of the outlet orifice, higher output rates can be obtained by increasing the width of the gap adjacent the outlet orifice. Such an increase in gap dimension can be obtained by appropriately contouring either of the confronting orifice plate and disc surfaces, or both.

It is, therefore, an important object of the present invention to provide an improved elastic melt extruder of increased output capability.

Another object of this invention is the provision of an elastic melt extruder of increased output rate wherein the driven disc of the extruder is subdivided into individually driven components of varying diameters and individually driven at a maximum rate without thermal degradation of the extrudate.

It is a further important object of this invention to provide an improved elastic melt extruder including a multi-part driven disc having a plurality of driven elements cooperable with an orifice plate and driven at different rotational speeds to obtain a surface speed at various portions of the composite disc face closely approaching the maximum allowable disc surface speed adjacent the extrusion orifice.

Yet another, and no less important, object of this invention is the provision of an elastic melt extruder including an orifice plate having a central extrusion orifice and a substantially radial face radiating therefrom and a rotatable disc assembly including a central circular disc face opposing the extrusion orifice and a plurality of concentric annular disc faces spaced from the extrusion plate face and means driving the central disc face and the annular disc faces at different speeds to obtain substantially constant surface speeds across the entire disc assembly face, the disc and/or plate faces being contoured to provide maximum clearance therebetween consistent with extruder output performance.

Other objects of this invention will appear in the following description and appended claims, reference being had to the accompanying drawings forming a part of this specification wherein like reference characters designate corresponding parts in the several views.

Figure 2:
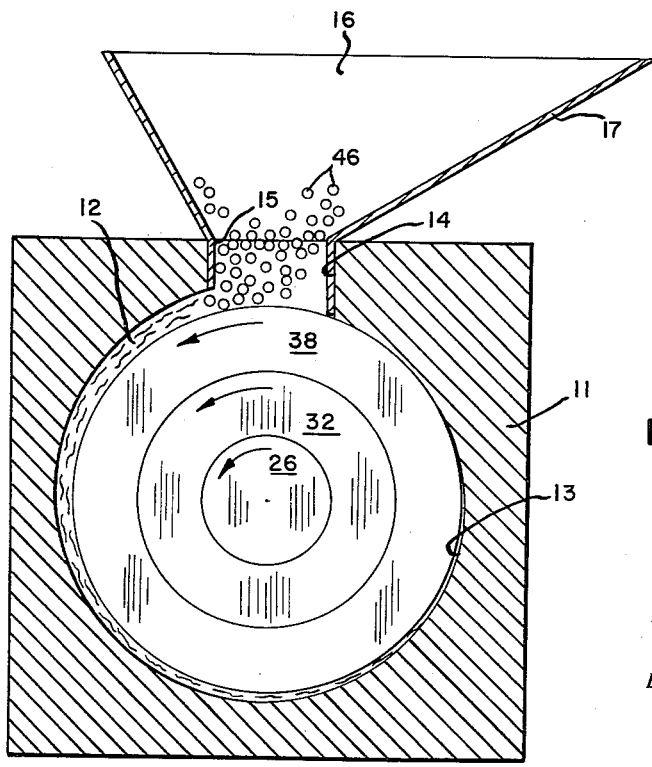

On the drawings:

FIGURE 1 is a vertical sectional view through an elastic melt extruder of the present invention; and FIGURE 2 is a sectional view taken along the plane 2—2 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers to an elastic melt extruder of the present invention. The term "extruder" as herein utilized refers to a device for plasticizing particulate, solid plastic material to a non-solid, heated, flowable state and issuing the material under pressure for later utilization and/or further processing to form a finished article by well known techniques, such as injection molding, tube or rod drawing, blow molding, or the like.

The extruder 10 may suitably comprise a housing 11 having an interior convolute chamber 12 defined by an interior arcuate wall 13, the convolute chamber 12 being of a diameter decreasing arcuately from a vertical inlet opening 14 within which is positioned an inlet conduit 15 communicating with an upper supply space 16 enclosed by a hopper or similar receptacle 17. The chamber 12 is partially closed at its rear end by an annular plate 18 secured to the housing 11 by screws 18a and having a central opening 19 for a purpose to be hereinafter more fully described.

The open forward end of the chamber is closed by an orifice plate 20 overlying the chamber and secured to the body 11 by suitable means, as by cap screws 21. The orifice plate 20 is provided with a central, axially extending extrusion opening 22 communicating with the chamber 12 and opening onto the interior face 23 of the plate 20.

Projecting axially into the chamber 12 in axial alignment with the aperture 22 is a first driven disc element 25 having a forward face 26 opposing the extrusion orifice 22 and spaced axially from the interior face 23 of the orifice plate 20. This first disc element 25 is provided with a peripheral gear 27 either formed integrally with the element 25 or secured thereto for co-rotation therewith.

An annular second disc element 30, which is generally cylindrical in contour, surrounds the element 25, the element 30 having an axial bore 31 through which the element 25 extends. The second disc element 30 terminates in a forward annular face 32 concentric with and forming a radial extension of the disc face 26. This second disc element is, necessarily, of larger diameter than the first element 25 and is provided with an encircling gear 33.

An annular third disc element 35 surrounds the second disc element 30. This third disc element 35 has a bore 36 axially receiving therethrough the second disc element 30 and also has a medial peripheral groove 37 snugly mating in the aperture 19 of the annular wall 18 of the stationary casing 11. The forward face 38 of this third disc element 35 is annular and lies in radial alignment with the faces 32 and 26 of the second disc element 30 and the first disc element 25, respectively. The third disc element 35 has a gear 39 formed thereon or secured thereto for co-rotation.

The disc elements 25, 30 and 35 are all rotatable about a central longitudinal axis A and this axis also forms the center about which the cylindrical extrusion orifice 22 is formed. Extending parallel to this axis A is a drive shaft 40 driven by a motor M through gearing G at an appropriate, predetermined speed. Positioned at the terminal end of this shaft 40 is a first relatively small gear 41 meshing with the gear 39 of the third disc element 35. Adjacent the gear 41 is a somewhat larger gear 42 co-rotatable with the shaft 40 and meshing with the gear 33 of the second disc element 30. A third gear 43 substantially larger than either of the gears 39 and 42 meshes with the gear 27 of the first disc element 25.

It will be noted that the faces 26, 32 and 38 of the elements 25, 30 and 35, respectively, are spaced from the interior face 23 of the orifice plate 20 to create therebetween a gap 45 within which the actual shearing of particulate plasticized material 46 occurs, such material being introduced from the hopper 17 through the supply conduit 15 into the convolute chamber 12. Further, the face 23 is not truly radial to the axis A, but is somewhat frusto-conical so that the gap 45 increases inwardly toward the extrusion orifice 22. As illustrated, the axial extent of the gap has been greatly exaggerated for clarity, this gap being quite minute in size and ranging downwardly to as small as $1/16$ of an inch.

Thus, upon driving the shaft 40 through the gearing G, the motor M rotates the three disc elements 25, 30 and 35 at differential speeds. Preferably, the driven speeds of the disc elements are correlated, so that the maximum surface speed of the face of any one of the disc elements is substantially the same as the surface speed of the others of the disc elements.

Thus, in the preferred embodiment of this invention, the speed of driving the disc elements may be set individually and predetermined by the gear ratios of the gear sets 41—39, 42—33 and 43—27, so that the maximum surface speed, which of course occurs at the outer periphery of each disc element, is substantially the same as the maximum surface speed of each of the other elements.

The operation of the extruder 10 will be readily appreciated. Upon driving of the shaft 40, the gear set 41—39 will drive the outermost or third disc element 35 at a slower rate than the gear set 42—33 will drive the second disc element 30 which, in turn, is at a slower speed than the gear set 43—27 will drive the innermost disc element 25. It will be noted that the rotational speeds of the disc elements are inversely proportional to the maximum diameters thereof. In fact, it is preferred that the driving speed of each disc element is carefully correlated with its diameter, so that the disc elements are driven at speeds such that the maximum surface speeds attained at the disc faces 26, 32, 38 are substantially the same.

In this manner, each such disc element exerts substantially the same shearing effect upon material in the gap 45, and there is no steadily decreasing surface speed differential and corresponding shearing effect drop across the faces 26, 32 and 38 as there would be across the face of a single disc element, such as that illustrated in the above-identified Maxwell and Scalora publication.

Thus, the utilization of the plurality of disc elements 25, 30 and 35 makes possible the maintenance of a maximum shearing effect across substantially the entire shearing face presented by the combined surfaces 26, 32 and 38. Because of the maintenance of higher shearing efficiency across the face of the combined disc elements, a substantially greater overall shearing effect is obtained and the output rate of the elastic melt extruder is materially increased.

Due to this increase in shearing efficiency and the substantial increase in the output rate, it is possible to widen the gap 45 adjacent the extrusion orifice 22, thereby accommodating the flow of additional quantities of plasticized materials through the gap 45 and into the extrusion orifice 22.

In other embodiments of this invention the maximum surface speed of the inner disc faces 26 and 32 may actually be greater than the surface speed of the outer, larger diameter disc face 38 or greater than that surface speed which would cause thermal degradation by the use of a single, large diameter disc. Thermal degradation in a plastic material is a time-temperature phenomenon and the inner disc face 26 and the intermediate disc face 32 are in contact with the material for very short periods of time since the material issues immediately through the central orifice 22. Thus, the material may not be subjected to the greater heat-inducing speed of the inner disc face for a sufficient period to allow a build-up of degrading temperature. Further, where the gap 45 increases toward the orifice 22, the shearing effect of such rapid rotation will be lessened, and consequently less heat will be induced in the material.

In still other embodiments of this invention, the maximum surface speed of the inner discs may be substantially less than the surface speed of the outer disc. In such an event, the maximum shearing effect will be obtained at the outer disc face, and the inner disc faces serve primarily to advance the material to the orifice 22 and to mix and further plasticize the material which is primarily plasticized by the shearing effect of the first, largest diameter disc face. However, due to the substantial differences in diameter of the disc outer peripheries, the inner discs are still driven at greater revolutions per minute even though the maximum surface speeds of the inner discs may be less than the maximum surface speed of the outer disc.

Thus, while it is preferred that the disc elements be driven at substantially the same maximum surface speeds, it is quite possible to vary such maximum surface speeds, if desired. The danger of thermal degradation is substantially reduced where the inner discs are driven at greater surface speeds by the short period of disc-material contact. Where the inner discs are driven at lesser surface speeds, primary plasticization occurs at the outer disc surface.

While substantially greater operating efficiencies can be obtained without varying the area of the gap 45 to increase the gap toward the extrusion orifice 22, a maximum synergistic effect is obtained by utilizing the widened gap in combination with the plurality of driving discs 25, 35 and 30. Further, a substantially constant shearing effect is obtained across the entire shearing gap where the inner rotatable faces are driven faster, but shearing is accomplished across a wider shearing gap.

Of course, the invention is illustrated in FIGURES 1 and 2 in somewhat schematic form and it will be appreciated that anti-friction bearings may readily be inserted between the disc elements 25, 30 and 35 and that many different forms of driving mechanism for maintaining the desired driven speed correlation between the disc elements may be utilized other than the gearing arrangement schematically illustrated.

I claim:

1. An elastic melt extruder comprising a casing peripherally enclosing a convolute chamber, means for supplying solid plastic material to the convolute chamber, an orifice plate substantially radial to the convolute chamber and having a central orifice supplying an outlet for extrudate from the chamber, a plurality of individual shearing elements disposed within the chamber for close-running shearing cooperation with the orifice plate, and means for driving said shearing elements at different rotational speeds.

2. In an elastic melt extruder including a casing peripherally enclosing a convolute chamber, means for supplying solid plastic material to the convolute chamber, and an orifice plate bridging the convolute chamber and having a central orifice supplying an outlet for extrudate from the chamber, the improvements of a plurality of individual shearing elements disposed within the chamber and having concentric shearing faces cooperable with the orifice plate, and means for driving said elements rotationally at different speeds, respectively.

3. An elastic melt extruder comprising a casing peripherally enclosing an open-ended plasticizing chamber, means for supplying solid plastic material to the chamber, an orifice plate closing one end of said chamber and defining a central outlet for extrudate from the chamber, a central-shearing disc having a circular end face disposed within the chamber in spaced relation to the orifice, a plurality of shearing elements having annular end faces concentric with the shearing disc face, and means driving said disc and said elements at different rotational speeds but at substantially the same maximum surface speeds at said shearing faces.

4. In an elastic melt extruder including a casing peripherally enclosing a plasticizing chamber and means for supplying solid plastic material to the convolute chamber, the improvements of an orifice plate bridging the chamber and having a central orifice supplying an outlet for extrudate from the chamber, a plurality of concentric shearing elements disposed within the chamber and each having a shearing face spaced from the interior surface of the orifice plate, and means for driving said shearing elements at different rotational speeds, said orifice plate interior surface being concave in configuration to increase the shearing face-to-orifice plate gap radially inwardly of the plate toward the orifice.

5. An elastic melt extruder comprising a casing peripherally enclosing an open-ended plasticizing chamber, means for supplying solid plastic material to the chamber, an orifice plate closing one end of said chamber and having a shearing face defining a central outlet for extrudate from the chamber, a plurality of nested shearing elements having end faces concentric with the shearing face and spaced therefrom through a shearing gap, and drive means including sets of gears for said elements, respectively, rotating said elements at differing rotational speeds increasing toward the central shearing element to prevent a drop in shearing efficiency during the passage of material through said gap.

6. In an elastic melt extruder comprising a casing peripherally enclosing a convolute chamber and means for supplying solid plastic material to the convolute chamber, the improvements of an orifice plate substantially radial to the convolute chamber and having a central orifice supplying an outlet for extrudate from the chamber, a plurality of individual shearing elements disposed within the chamber and having concentric shearing faces each in close-running shearing relation to the orifice plate, the shearing faces and the orifice plate defining a shearing gap increasing in width toward the orifice, and means for driving said shearing elements at different rotational speeds, the rotational speeds of said elements increasing in inverse proportion to the diameters of the faces thereof.

7. The method of plasticizing and extruding plastic material comprising introducing particulate material into a shearing gap defined by the end faces of a plurality of concentrically rotatable shearing elements and a fixed shearing surface, rotating the shearing elements at different speeds to obtain substantially equal shearing efficiencies at said end faces, and discharging plasticized extrudate from said gap.

8. In a method of extruding plastic material from an elastic melt extruder having a plurality of rotatable shearing faces of different diameters cooperable with a fixed shearing face to define a shearing gap therebetween, the steps of introducing solid plastic material into said gap, driving said rotatable shearing faces at different rotational speeds inversely proportional to their outer circumferences and discharging plasticized material from the gap centrally of the fixed shearing face.

9. In a method of extruding plastic material, the steps of successively shearing the material in a plurality of shearing zones concentric about an outlet orifice and defined between separate driven shearing faces and a fixed shearing face, the successive shearing being accomplished at substantially the same maximum driven shearing face speeds, in each of said zones, and extruding the material in plasticized condition through said outlet orifice.

10. In a method of extruding plastic material, the steps of successively shearing the material in a plurality of shearing zones concentric about an outlet orifice and defined between separate driven shearing faces and a fixed shearing face, the successive shearing being accomplished at different maximum driven shearing face speeds in each of said zones, and extruding the material in plasticized condition through said outlet orifice.

11. In a method of extruding plastic material from an elastic melt extruder, the steps of successively shearing the material in a plurality of shearing gaps of increasing axial extent defined between relatively rotatable shearing surfaces, and increasing the speed of relative rotation of said surfaces in direct proportion to the increase in axial extent of the gap therebetween to maintain a substantially constant shearing effect.

12. In a method of extruding plastic material from an elastic melt extruder having concentric, independently rotatable discs cooperating with a fixed plate to define therebetween a shearing gap of increasing axial extent toward a central orifice, the step of rotating said discs at different speeds directly proportional to the extent of the gap between said discs, respectively, and the plate to maintain a substantially constant shearing effect throughout the gap.

References Cited in the file of this patent

UNITED STATES PATENTS 2,919,467　Mercer ------------------ Jan. 5, 1960

FOREIGN PATENTS 1,221,112　France ------------------ May 31, 1960

OTHER REFERENCES

Maxwell and Scalora article, October 1959, Modern Plastics, pages 107–114 and 202–210.